United States Patent [19]

Takaki et al.

[11] Patent Number: 5,489,626

[45] Date of Patent: Feb. 6, 1996

[54] ADMIXTURE FOR HYDRAULIC CEMENT

[75] Inventors: Toshihiko Takaki, Yokohama; Kenji Tsuboi, Kamakura; Tsugio Matsubara, Yokohama; Atsushi Ito, Yokohama; Shouichi Araseki, Chigasaki, all of Japan

[73] Assignee: Mitsui Toatsu Chemicals, Inc., Tokyo, Japan

[21] Appl. No.: 344,601

[22] Filed: Nov. 18, 1994

[30] Foreign Application Priority Data

Nov. 24, 1993  [JP]  Japan .................................. 5-293006
Nov. 24, 1993  [JP]  Japan .................................. 5-293007

[51] Int. Cl.$^6$ ................................................ C08K 3/22
[52] U.S. Cl. ............................................. 523/130; 524/424
[58] Field of Search ........................... 525/291, 301, 525/339, 362, 355, 329.4; 523/130, 139; 524/424

[56] References Cited

U.S. PATENT DOCUMENTS

| | | | |
|---|---|---|---|
| 2,729,560 | 1/1956 | House et al. ................................. | 92/3 |
| 2,890,978 | 6/1959 | Woodberry et al. .................... | 162/168 |
| 3,936,408 | 2/1976 | Adams et al. ......................... | 523/130 |
| 4,015,991 | 4/1977 | Persinski et al. ...................... | 523/130 |
| 4,632,186 | 12/1986 | Boncan et al. ......................... | 523/130 |
| 4,712,617 | 2/1987 | Kocsis . | |
| 4,785,055 | 11/1988 | Dexter et al. ........................ | 525/329.4 |
| 5,039,757 | 8/1991 | Takaki et al. ........................ | 525/329.4 |
| 5,239,014 | 8/1993 | Takaki et al. ........................ | 525/329.4 |
| 5,292,821 | 3/1994 | Takaki et al. ........................ | 525/329.4 |

FOREIGN PATENT DOCUMENTS

| | | |
|---|---|---|
| 377313 | 7/1990 | European Pat. Off. . |
| 54-145790 | 11/1979 | Japan . |
| 59-026956 | 2/1984 | Japan . |
| 60-58404 | 4/1985 | Japan . |
| 61-200103 | 9/1986 | Japan . |
| 60-210554 | 11/1989 | Japan . |
| 1-55210 | 11/1989 | Japan . |

*Primary Examiner*—Veronica P. Hoke
*Attorney, Agent, or Firm*—Burns, Doane, Swecker & Mathis

[57] ABSTRACT

A hydraulic cement composition comprising as an effective component a water-soluble amphoteric polymer obtained by Hofmann degradation reaction of an $\alpha,\beta$-unsaturated carbonamide polymer or a copolymer of $\alpha,\beta$-unsaturated carbonamide and an anionic monomer having a weight average molecular weight of 1,000–1,000,000.

The primary amino group produced as a result of the Hofmann degradation reaction provides excellent cement dispersing capabilities.

13 Claims, No Drawings

ADMIXTURE FOR HYDRAULIC CEMENT

BACKGROUND OF THE INVENTION

1. Field of the Invention

This invention relates to an admixture for hydraulic cement containing, as an effective component, an acrylamide amphoteric polymer produced as a result of Hofmann degradation reaction. More particularly, the present invention relates to a sophisticated admixture for hydraulic cement that prevents deterioration in workability of concrete or mortar with the passage of time and permits improvement of constructability and application properties thereof.

2. Description of the Related Art

Hydraulic cement composition containing cement, water, aggregate and admixtures loses fluidity with the passage of time because cement coheres both chemically and physically when mixed with water. This means that the hydraulic cement composition is deteriorated with the passage of time in constructability and application properties. Such deterioration may sometimes cause troubles in, for example, pumping, the cement composition. If pumping may be suspended for some reason and restarted later, the fluidity of the hydraulic cement composition in a pipe is reduced to cause a rapid increase of the pumping pressure or even clogging of the pipe. The fluidity may be improved with an increased amount of water mixed, which, however, significantly reduces the strength of the resultant concrete.

To overcome the above mentioned problems, various water reducing agents for hydraulic cement have been proposed such as lignin sulfonic acid salt, hydroxy carboxylic acid salt, β-naphthalenesulfonic acid salt-formalin condensation products, sulfonate group-containing melamine-formaldehyde resins, and polycarboxylic acid salt. More recently, it has been proposed to use water reducing agents such as a partial-hydrolysis product of polyacrylamide or a copolymer of an anionic monomer and acrylamide to reduce slump loss (Japanese Patent Publication No. HEI 1-55210/1989). These water reducing agents, however, have only an unsatisfactory level of physical properties including dispersion fluidity, slump holding properties, and storage stability to follow recent development of architecture and civil engineering technologies. With this respect, there have been strong demands for more sophisticated water reducing agents.

SUMMARY OF THE INVENTION

According to the present invention, there is provided an admixture for hydraulic cement comprising as an effective component an amphoteric polymer obtained by reacting an α,β-unsaturated carbonamide polymer having a weight average molecular weight of 1,000–1,000,000 with 10–100 mole % of hypohalogenous acid or salt thereof relative to carbonamide group under alkaline conditions at pH 10 or higher. In addition, there is provided with an admixture for hydraulic cement comprising as an effective component an amphoteric polymer obtained by reacting a copolymer of 99.9–20 mole % of α,β-unsaturated carbonamide and 0.1–80 mole % of at least one anionic monomer selected from the group consisting of α,β-unsaturated monocarboxylic acid, α,β-unsaturated dicarboxylic acid, α,β-unsaturated sulfonic acid and salts thereof having a weight average molecular weight of 1,000–1,000,000 with 1–100 mole % of hypohalogenous acid or salt thereof relative to the carbonamide group of the copolymer at pH/10 or higher.

DESCRIPTION OF THE PREFERRED EMBODIMENTS

The present inventors have found that an acrylamide polymer that is cation-modified as a result of Hofmann degradation reaction (hereinafter, referred to as Hofmann PAM) and has a predetermined molecular weight exhibits improved properties as a water reducing agent for hydraulic cement. The present invention was thus completed.

An acrylamide polymer used for the Hofmann degradation reaction in the present invention is an α,β-unsaturated carbonamide polymer or a copolymer of α,β-unsaturated carbonamide with one or more anionic monomers selected from the Group consisting of α,β-unsaturated monocarboxylic acid (salts), α,β-unsaturated dicarboxylic acid (salts), and α,β-unsaturated sulfonic acid (salts). For the latter case, typical amounts of α,β-unsaturated carbonamide and anionic monomer are 99.9–20 mole % and 0.1–80 mole %, respectively. The acrylamide polymer may be the one which is copolymerized with one or more third unsaturated monomers capable of being copolymerized.

The α,β-unsaturated carbonamide used in the present invention may be, for example, acrylamide or methacrylamide. Examples of α,β-unsaturated monocarboxylic acid (salts) include acids or salts thereof such as acrylic acid, methacrylic acid, crotonic acid and the like. Examples of α,β-unsaturated dicarboxylic acid (salts) include maleic anhydride, maleic acid, fumaric acid, itaconic acid, citraconic acid and the like, and salts thereof. Examples of α,β-unsaturated unsaturated sulfonic acid (salts) include vinyl sulfonic acid, allyl sulfonic acid, methallyl sulfonic acid, styrene sulfonic acid, 2-acrylamide-2-phenyl propane sulfonic acid, 2-acrylamide-2-methyl propane sulfonic acid and the like, and salts thereof.

The copolymer of an α,β-unsaturated carbonamide and an anionic monomer is usually obtained by copolymerization of the α,β-unsaturated carbonamide with above mentioned anionic monomer. When the anionic monomer is an α,β-unsaturated carboxylic acid, carboxyl groups can also be incorporated by a well known hydrolysis reaction of amide groups of the α,β-unsaturated carbonamide polymer under acid or alkaline conditions. In this case, hydrolysis may be carried out before a Hoffmann degradation reaction or after a Hoffmann degradation reaction under such condition as amide groups remain. It is also possible to carry out hydrolysis both before and after the Hoffmann degradation reaction.

Examples of the unsaturated monomer capable of being copolymerized include hydrophilic, cationic and lipophilic monomers, one or more of which may be applied to the present invention.

More specifically, examples of the hydrophilic monomer include diacetone acrylamide, N,N-dimethyl acrylamide, N,N-dimethyl methacrylamide, N-ethyl methacrylamide, N-ethyl acrylamide, N,N-diethylacrylamide, N-propyl acrylamide, N-acryloyl pyrrolidine, N-acryloyl piperidine, N-acryloyl morpholine, hydroxyethyl methacrylate, hydroxyethyl acrylate, hydroxypropyl methacrylate, hydroxypropyl acrylate, acrylates and methacrylates of methoxy polyethylene glycols, N-vinyl-2-pyrrolidone and the like.

Examples of the cationic monomer include amines such as N,N-dimethylaminoethyl methacrylate, N,N-diethylaminoethyl methacrylate, N,N-dimethylaminoethyl acrylate, N,N-dimethylaminopropyl methacrylamide, N,N-dimethylaminopropyl acrylamide and salts thereof.

Examples of the lipophilic monomer include N-alkyl acrylamide derivatives and N-alkyl methacrylamide derivatives such as N,N-di-n-propyl acrylamide, N-n-butyl acrylamide, N-n-hexyl acrylamide, N-n-hexyl methacrylamide, N-n-octyl acrylamide, N-n-octyl methacrylamide, N-tert-octyl acrylamide, N-dodecyl acrylamide, and N-n-dodecyl methacrylamide; N-(ω-glycidoxyalkyl)acrylamide derivatives and N-(ω-glycidoxyalkyl)methacrylamide derivatives such as N,N-diglycidyl acrylamide, N,N-diglycidyl methacrylamide, N-(4-glycidoxybutyl)acrylamide, N-(4-glycidoxybutyl)methacrylamide, N-(5-glycidoxypentyl)acrylamide, and N-(6-glycidoxyhexyl)acrylamide; acrylate derivatives and methacrylate derivatives such as methyl acrylate, methyl methacrylate, ethyl acrylate, ethyl methacrylate, butyl acrylate, butyl methacrylate, lauryl acrylate, lauryl methacrylate, 2-ethylhexyl acrylate, 2-ethylhexyl methacrylate, glycidyl acrylate, and glycidyl methacrylate; olefins such as acrylonitrile, methacrylonitrile, vinyl acetate, vinyl chloride, vinylidene chloride, ethylene, propylene, and butene; styrene; divinyl benzene; α-methyl styrene; butadiene; and isoprene. While depending on the type and combination thereof, an amount of the unsaturated monomer(s) used for copolymerization is in a range approximately from 0% to 30% by weight.

The acrylamide polymer is preferably polymerized through radical polymerization. An applicable polymerization solvent may be a polar solvent such as water, alcohol, and dimethyl formamide. A monomer concentration is from 2% to 40% by weight, and preferably from 5% to 30% by weight.

A polymerization initiator is not limited to a specific one as long as it is a water-soluble polymerization initiator. More specifically, the polymerization initiator may be, for example, a peroxide such as ammonium persulfate, potassium persulfate, hydrogen peroxide, tert-butyl peroxide. In this case, while applicable alone, these initiators may be used in combination with a reducing agent as a redox polymerization agent.

The reducing agent may be, for example, sulfite, bisulfite, salts of low valency ions of iron, copper, and cobalt; organic amines such as N,N,N',N'-tetramethylethylenediamine; and reducing sugar such as aldose and ketose.

The polymerization initiator may be, for example, azo compounds such as 2,2'-azobis-2-amidinopropane chloride, 2,2'-azobis-2,4-dimethylvaleronitrile, 4,4'-azobis-cyanovaleinic acid and salts thereof. In addition, two or more polymerization initiators may be used together.

The amount of the initiator added is from 0.01% to 10% by weight, and preferably from 0.1% to 8% by weight relative to the monomer. For redox polymerization, the amount of the reducing agent added is from 0.1% to 100%, and preferably from 0.2% to 80% by mole relative to the initiator(s).

A chain transfer agent may be used, if necessary. Examples of the chain transfer agent include isopropyl alcohol, allyl alcohol, α-thioglycerol, mercaptosuccinic acid, thioglycolic acid, and triethylamine and the like.

A polymerization temperature may be approximately from 30° to 90° C. when a single polymerization initiator is used and may be approximately from 5° to 50° C. when a redox polymerization initiator is used. The polymerization temperature may be changed rather than being kept constant during polymerization. The polymerization temperature typically increases due to the heat of polymerization generated as the polymerization reaction proceeds. If the polymerization is conducted at a high concentration, heat may be removed if necessary. While not limited specifically, the atmosphere in a polymerization vessel may preferably be substituted by an inert gas such as nitrogen to permit rapid polymerization. There is no limitation on a polymerization time, which may be approximately 1 to 20 hours.

A weight average molecular weight of the acrylamide polymer used in the present invention may be determined by using a GPC column (e.g., Shodex OHpak SB-800 HQ series). The weight average molecular weight is in a range from 1,000 to 1,000,000 converted to a pullulan value. A polymer having a weight average molecular weight larger than 1,000,000 results in such a high viscosity in an aqueous solution that it may cause troubles in handing. On the other hand, a polymer having a weight average molecular weight smaller than 1,000 provides only poor fluidity.

The Hofmann degradation reaction is conducted by reacting the acrylamide polymer obtained in the manner described above with hypohalogenite under alkaline condition at pH 10 or higher. Examples of the hypohalogenite include alkali metal salts and alkaline earth metal salts of hypochlorous acids such as sodium hypochlorite, potassium hypochlorite, lithium hypochlorite, calcium hypochlorite, magnesium hypochlorite, and barium hypochlorite. Likewise, alkali metal salts and alkaline earth metals of hypobromous and hypoiodous acids may equally be applied. An amount of the hypohalogenous acid or salt thereof added to the acrylamide polymer may be from 10 to 100 mole %, preferably 40 to 100 mole % relative to carbonamide group of polymer when no anionic monomer is copolymerized, and from 1 to 100 mole %, preferably 20 to 100 mole % when an anionic monomer is copolymerized.

An alkaline substance is typically coexistent from 0.8 to 4.0 times as large as the number of moles of hypohalogenite since the Hofmann degradation reaction is conducted under alkaline conditions at pH of 10 or higher. Examples of the alkaline substance applicable include alkali metal hydroxides, alkaline earth metal hydroxides and alkali metal carbonates and the like. Of these, alkali metal hydroxides are preferable such as sodium hydroxide, potassium hydroxide, and lithium hydroxide.

In conducting the Hofmann degradation reaction by mixing an aqueous solution of an acrylamide polymer with hypohalogenite and an alkaline substance, the order of mixing is not limited specifically. The alkaline substance may be added first. No problem will occur when the hypohalogenite is added first. However, a higher reaction temperature may cause gelation of the mixture. In this respect, it is preferable to add the alkaline substance first or to add the alkaline substance and the hypohalogenite after being mixed previously. A line mixer may be used for mixing the compounds. Alternatively mixing is conducted while stirring the compounds in a reaction vessel.

The reaction temperature may be from 0° to 110° C. While depending on the reaction temperature and the reaction concentration, a typical reaction time may be from 30 to 40 hours at 0° C., from 3 to 4 hours at 20° C., in scores of minutes at 50° C., in a few minutes at 65° C., and in scores of seconds at 80° C. The Hofmann degradation reaction is an exothermic reaction, so that a temperature rise cannot be negligible at a higher reaction concentration or at a higher Hofmann degradation rate. In such a case, it is necessary to cool a solution before mixing or to remove the heat of reaction. The reaction temperature is not required to be kept constant, and the reaction time may be shortened considering the temperature rise due to the heat of reaction.

The Hofmann PAM produced under the above mentioned conditions is an amphoteric polymer having a cation equivalent of from approximately 0.5 to 10.0 meq./g measured by colloid titration at pH 2, and an anion equivalent of from approximately 0.1 to 10.0 meq./g measured by colloid titration at pH 10, when no anionic monomer is copolymerized. When an anionic monomer is copolymerized, the cation and anion equivalents measured in the above mentioned manner are from approximately 0 to 10.0 meq./g and from approximately 0.1 to 12.0 meq./g respectively.

After the reaction is completed the obtained Hofmann PAM may be used as it is. However, the hypohalogenite is converted into halogenide such as NaCl or NaBr after the Hofmann degradation reaction and it is thus preferable to remove these inorganic salts. Desalting may be made by any one of the known methods by using, for example, a separation membrane or an ion exchange resin. Alternatively, the Hofmann PAM may be purified by reprecipitation with a water-based organic solvent such as methanol.

The admixture for hydraulic cement according to the present invention which contains as the effective component the acrylamide polymer obtained through the Hofmann degradation reaction may be mixed with cement to form a hydraulic cement composition. The amount of the acrylamide polymer added to cement depends on the type of the cement used. It also depends on the type and a mixing ratio of fine or coarse aggregates, if used. However, a preferable amount may be, as a solid component, 0.01% to 2.5% by weight relative to cement. An amount of less than 0.01% by weight cannot provide a sufficient level of workability while an amount of more than 2.5% by weight is disadvantageous in the economic aspect. There is no limitation on the type of the cement used. The cement may be, for example, ordinary Portland cement, early strength Portland cement, alumina cement, fly ash cement, blast furnace cement, silica cement, various mixing cement or the like. The fine and coarse aggregates may be any one of those typically used for a common hydraulic cement composition. Examples of the fine aggregates include river sand, land sand, mountain sand, ocean sand, and blast furnace slag, while examples of the coarse aggregates include river gravel, land gravel, and mountain gravel.

In addition, typical admixing agents may be used together such as air entraining agents, early strength agents, retarders, water-proofing agents, anti-rust agents, water holding agents, colorants, preservatives, glass fibers, fly ash, blast furnace slag, and silica powder.

A cement composition to which the admixture for hydraulic cement according to the present invention is added at an amount of 0.01% to 2.5% by weight relative to cement exhibits the fluidity similar to that of cement compositions containing no such admixture, even when the amount of water used in the composition is reduced by from 15% to 30% by weight.

The Hofmann PAM used in the present invention may be used as a water reducing agent for gypsum other than cement.

The present invention is described more in detail below in conjunction with a set of examples. In the following non-limiting examples, percentage represents percentage by weight without a specific notice.

EXAMPLE 1

Into a 1-1 stainless (SUS304) dewar vessel equipped with a stirrer, a thermometer, and a nitrogen gas inlet adapter was added an aqueous solution mixed 400.0 g (2.25 mol) of 40% acrylamide with 240.0 g of ion exchange water. The solution was adjusted to pH 4.5 with 10% hydrochloric acid. The temperature of the solution was adjusted to 15° C. Nitrogen gas was blown into the vessel to purge air over 15 minutes. Subsequently, a 10%-ammonium persulfite solution and a 10% sodium bisulfite were introduced into the solution while stirring to initiate polymerization. The inside temperature was increased to 84° C. Then, the solution was stirred continuously for 2 hours. The weight average molecular weight of the resultant acrylamide polymer was 13,400, measured by using a GPC column (Shodex OHpak KB-80M*2 available from Showa Denko KK). This was determined as polymer A.

Then, an aqueous solution of polymer A was diluted to a 20% solution, and 150.0 g (0.42 mol (monomer unit)) of which was charged into a 1-1 four-neck flask equipped with a stirrer, a reflux condenser, and a thermometer. The content of the flask was cooled to 10° C. Then, 84.4 g (0.84 mol) of 40%-caustic soda solution and 251.4 g (0.42 mol) of 12.5%-sodium hypochlorite were added simultaneously while stirring. As a result, reaction was initiated immediately. The temperature of the reaction solution rose up to 75° C. in 1 minute and 10 seconds after initiation. The content of the flask was continuously stirred for 5 minutes while being cooled with air. The cation equivalent of the reaction solution was 7.5 meq./g, while the anion equivalent was 1.1 meq./g. This was determined as polymer A-1.

EXAMPLE 2

Example 1 was repeated to conduct the reaction except that 50.6 g (0.51 mol) of 40%-caustic soda solution and 150.8 g (0.25 mol) of 12.5%-sodium hypochlorite solution were added to 150.0 g (0.42 mol (monomer unit)) of 20 wt. % solution of polymer A and that the temperature of the polymer solution before reaction was 35° C. The temperature of the reaction solution rose to 77° C. in 20 seconds after addition. The solution was continuously stirred for 5 minutes while being cooled with air. The resultant polymer is determined as polymer A-2. The cation and anion equivalents were 5.9 meq./g and 1.0 meq./g respectively.

EXAMPLE 3

Example 1 was repeated to conduct the reaction except that 33.8 g (0.34 mol) of 40%-caustic soda solution and 100.5 g (0.17 mol) of 12.5%-sodium hypochlorite solution were added to 150.0 g of 20 wt. % solution of polymer A and that the temperature of the polymer solution before reaction was 35° C. The temperature of the reaction solution rose up to 77° C. in 20 seconds after addition. The solution was continuously stirred for 5 minutes while being cooled with air. The resultant polymer is determined as polymer A-3. The cation and anion equivalents were 4.3 meq./g and 1.5 meq./g, respectively.

COMPARATIVE EXAMPLE 1

Example 1 was repeated to conduct the reaction except that 4.2 g (0.04 mol) of 40%-caustic soda solution and 12.6 g (0.02 mol) of 12.5%-sodium hypochlorite solution were added to 150.0 g of 20 wt. % solution of polymer A and that the temperature of the polymer solution before reaction was 70° C. The resultant polymer is determined as polymer A-4. The cation and anion equivalents were 0.7 meq./g, and 0.5 meq./g respectively.

COMPARATIVE EXAMPLE 2

8.4 g (0.08 mol) of 40%-caustic soda solution was added to 150.0 g (0.42 mol (monomer unit)) of 20 wt. % solution of polymer A. Hydrolysis reaction was conducted at 65 ° C.

over 2 hours. The resultant polymer is determined as polymer A-5. The anion equivalent was 2.5 meq./g.

EXAMPLE 4

Into a 1-l stainless (SUS304) dewar vessel equipped with a stirrer, a thermometer, and a nitrogen gas inlet adapter was added an aqueous solution mixed 400.0 g (2.25 mol) of 40% acrylamide with 400.0 g of ion exchange water. The solution was adjusted to pH 4.5 with 10% hydrochloric acid. A temperature of the solution was adjusted to 20° C. Nitrogen gas was blown into the dewar vessel to purge air over 15 minutes. Subsequently, a 10%-ammonium persulfite solution and a 10% sodium bisulfite were introduced into the solution while stirring to initiate polymerization. The inside temperature was increased to 75° C. Then, the solution was stirred continuously for 2 hours. The weight average molecular weight of the resultant acrylamide polymer was 34,700, measured by using a GPC column (Shodex OHpak KB-80M*2 available from Showa Denko KK). This was determined as polymer B.

Then, 150.0 g (0.42 mol (monomer unit)) of polymer B was charged into a 1-l four-neck flask equipped with a stirrer, a reflux condenser, and a thermometer. The temperature of the contents of the flask was adjusted to 35° C. Then, 33.8 g (0.34 mol) of 40%-caustic soda solution and 100.5 g (0.17 mol) of 12.5%-sodium hypochlorite were added simultaneously while stirring. As a result, reaction was initiated immediately. The temperature of the reaction solution rose to 70° C. in 30 seconds after initiation. A cation equivalent of the reaction solution was 4.3 meq./g, while an anion equivalent was 1.5 meq./g. This was determined as polymer B-1.

The acrylamide polymers obtained in Examples 1 through 4 and Comparative Examples 1 and 2 were tested according to JIS-R-5201 on properties as a water reducing agent for hydraulic cement. More specifically, 260 g of water containing 7.5 g, 5.0 g, 2.5 g, and 1.5 g (1.25 g for Example 4) of acrylamide polymers, respectively, as solid components was added to 1 kg of ordinary Portland cement. The mixture was stirred for 3 minutes in a mortar mixer and the flow value of the cement was determined. Formation and flow values of the acrylamide polymers are given in Table 1. The flow value of cement paste with no addition of polymer was 150.

EXAMPLE 5

Into a 1-l stainless (SUS304) dewar vessel equipped with a stirrer, a thermometer, and a nitrogen gas inlet adapter was added an aqueous solution mixed 278.8 g (1.57 mol) of 40% acrylamide and 60.58 g (0.67 mol) of 80% acrylic acid with 460.6 g of ion exchange water. The solution was adjusted to pH 4.5 with 10% caustic soda. The temperature of the solution was adjusted to 20° C. Nitrogen gas was blown into the dewar vessel to purge air over 15 minutes. Subsequently, a 10%-ammonium persulfite solution and a 10% sodium bisulfite were introduced into the solution while stirring to initiate polymerization. The inside temperature was increased to 75° C. Then, the solution was stirred continuously for 2 hours. The weight average molecular weight of the resultant anionic acrylamide polymer was 30,300, measured by using a GPC column (Shodex OHpak KB-80M*2 available from Showa Denko KK). This was determined as polymer C.

Then, 150.0 g (0.42 mol (monomer unit)) of 20% aqueous solution of polymer C was charged into a 1-l four-neck flask equipped with a stirrer, a reflux condenser, and a thermometer. The contents of the flask were heated to 50° C. Then, 16.8 g (0.17 mol) of 40%-caustic soda solution and 50.1 g (0.08 mol) of 12.5%-sodium hypochlorite were added simultaneously while stirring. As a result, reaction was initiated immediately. The temperature of the reaction solution rose up to 75° C. in 20 seconds after initiation. The content of the flask was continuously stirred for 5 minutes being while cooled with air. The cation equivalent of the reaction solution was 1.6 meq./g, while the anion equivalent was 2.4 meq./g. This was determined as polymer C-1.

EXAMPLE 6

Example 5 was repeated to conduct the reaction except that 33.6 g (0.34 mol) of 40%-caustic soda solution and 100.1 g (0.17 mol) of 12.5%-sodium hypochlorite solution were added to 150.0 g of 20% solution of polymer C and that the temperature of the polymer solution before reaction was 35° C. The temperature of the reaction solution rose up to 77° C. in 20 seconds after addition. The resultant polymer is determined as polymer C-2. The cation and anion equivalents were 3.5 meq./g, and 3.0 meq./g respectively.

EXAMPLE 7

Example 5 was repeated to conduct the reaction except that 58.8 g (0.59 mol) of 40%-caustic soda solution and 175.2 g (0.29 mol) of 12.5%-sodium hypochlorite solution were added to 150.0 g of 20% solution of polymer C and that the temperature of the polymer solution before reaction was

TABLE 1

| | Polymer | Base PAM Mw[1] | Hofmann Degradation Rate[2] mol % | Flow Value (Blank = 150) | | | |
|---|---|---|---|---|---|---|---|
| | | | | 0.15% | 0.25% | 0.50% | 0.75% |
| Example 1 | A-1 | 13,400 | 100 | >300 | >300 | >300 | >300 |
| Example 2 | A-2 | 13,400 | 60 | 258 | >300 | >300 | >300 |
| Example 3 | A-3 | 13,400 | 40 | 175 | 295 | >300 | >300 |
| Example 4 | B-1 | 34,700 | 40 | 175[4] | 291 | >300 | >300 |
| Comparative Example 1 | A-4 | 13,400 | 5 | —[3] | 177 | 240 | 265 |
| Comparative Example 2 | A-5 | 13,400 | — | —[3] | 153 | 235 | 251 |

[1] Weight average molecular weight
[2] Amount of sodium hypochlorite (mol %) relative to acrylamide monomer unit of base PAM
[3] Values not larger than Blank
[4] Values with 0.125% polymer used 20° C. The temperature of the reaction solution rose to 74° C. in 50 seconds after addition. The resultant polymer is determined as polymer C-3. The cation and anion equivalents were 5.7 meq./g, and 3.4 meq-/g respectively.

EXAMPLE 8

Into a 1-l stainless (SUS304) dewar vessel equipped with a stirrer, a thermometer, and a nitrogen gas inlet adapter was added an aqueous solution mixed 310.55 g (1.75 mol) of 40% acrylamide and 35.79 g (0.31 mol) of maleic acid with 453.66 g of ion exchange water. The solution was adjusted to pH 4.5 with 10% caustic soda. The temperature of the solution was adjusted to 20° C. Nitrogen gas was blown into the dewar vessel to purge air over 15 minutes. Subsequently, a 10%-ammonium persulfite solution and a 10% sodium bisulfite were introduced into the solution while stirring to initiate polymerization. Inside temperature was increased to 74° C. Then, the solution was stirred continuously for 2 hours. A weight average molecular weight of the resultant anionic acrylamide polymer was 28,700, measured by using a GPC column (Shodex OHpak KB-80M*2 available from Showa Denko KK). This was determined as polymer D.

Then, 150.0 g (0.39 mol (monomer unit)) of 20% aqueous solution of polymer D was charged into a 1-l four-neck flask equipped with a stirrer, a reflux condenser, and a thermometer. The contents of the flask were heated to 50° C. Then, 54.0 g (0.54 mol) of 40%-caustic soda solution and 160.68 g (0.27 mol) of 12.5%-sodium hypochlorite were added simultaneously while stirring. As a result, reaction was initiated immediately. The temperature of the reaction solution rose up to 75° C. in 20 seconds after initiation. The contents of the flask were continuously stirred for 5 minutes while cooled with air. The cation equivalent of the reaction solution was 5.8 meq./g, while the anion equivalent was 3.3 meq./g. This was determined as polymer D-1.

EXAMPLE 9

Into a 1-l stainless (SUS304) dewar vessel equipped with a stirrer, a thermometer, and a nitrogen gas inlet adapter was added an aqueous solution mixed 332.73 g (1.87 mol) of 40% acrylamide and 107.63 g (0.21 mol) of 25% sodium vinylsulfonate with 359.64 g of an ion exchange water. The solution was adjusted to pH 4.5 with 10% caustic soda. The temperature of the solution was adjusted to 20° C. Nitrogen gas was blown into the dewar to purge air over 15 minutes. Subsequently, a 10%-ammonium persulfite solution and a 10% sodium bisulfite were introduced into the solution while stirring to initiate polymerization. The inside temperature was increased to 75° C. Then, the solution was stirred continuously for 2 hours. A weight average molecular weight of the resultant anionic acrylamide polymer was 6,700, measured by using a GPC column (Shodex OHpak KB-80M*2 available from Showa Denko KK). This was determined as polymer E.

Then, 150.0 g (0.39 mol (monomer unit)) of 20% aqueous solution of polymer E was charged into a 1-l four-neck flask equipped with a stirrer, a reflux condenser, and a thermometer. The contents of the flask were heated to 50° C. Then, 54.6 g (0.55 mol) of 40%-caustic soda solution and 162.6 g (0.27 mol) of 12.5%-sodium hypochlorite were added simultaneously while stirring. As a result, reaction was initiated immediately. The temperature of the reaction solution rose to 72° C. in 20 seconds after initiation. The contents of the flask were continuously stirred for 5 minutes while being cooled with air. The cation equivalent of the reaction solution was 5.6 meq./g, while the anion equivalent was 2.2 meq./g. This is determined as polymer E-1.

COMPARATIVE EXAMPLE 3

Example 5 was repeated to conduct the reaction except that 0.42 g (4.2 mmol) of 40%-caustic soda solution and 1.25 g (2.1 mmol) of 12.5%-sodium hypochlorite solution were added to 150.0 g of 20% solution of polymer C. The resultant polymer is determined as polymer C-4. The cation equivalent of this reaction solution was not larger than 0.1 meq./g.

COMPARATIVE EXAMPLE 4

Into a 1-l glass separable flask equipped with a stirrer, a thermometer, and a nitrogen gas inlet adapter was added an aqueous solution mixed 318.7 g (1.79 mol) of 0% acrylamide and 40.4 g (0.45 mol) of 80%-acrylic acid, with 174.3 g of ion exchange water. The solution was adjusted to pH 4.5 with 10%-caustic soda solution. The temperature of the solution was adjusted to 15° C. Nitrogen gas was blown into the dewar to purge air over 15 minutes. Subsequently, a 10%-ammonium persulfite solution and a 10% sodium bisulfite were introduced into the solution while stirring to initiate polymerization under cooling with air. The inside temperature was increased to 88° C. Then, the solution was stirred continuously for 2 hours. The weight average molecular weight of the resultant acrylamide polymer was 17,800, measured by using a GPC column (Shodex OHpak KB-80M*2 available from Showa Denko KK). This was determined as polymer F. The anion equivalent was 2.8 meq./g.

The acrylamide polymers copolymerized with the anionic monomer, obtained in Examples 5 through 9 and Comparative Examples 3 and 4 were tested according to JIS-R-5201 on properties as a water reducing agent for hydraulic cement. More specifically, 260 g of water containing 7.5 g, 5.0 g, 2.5 g, and 1.25 g of acrylamide polymers, respectively, as solid components was added to 1 kg of ordinary Portland cement. The mixture was stirred for 3 minutes in a mortar mixer and the flow value of the cement was determined. Formation and flow values of the acrylamide polymers are given in Table 2. The flow value of cement paste with no addition of polymer was 144.

As is apparent from Tables 1 and 2, the Hofmann degradation reaction product of acrylamide and methacrylamide polymers have overwhelmingly improved cement water reducing agent properties as compared with conventional acrylamide and methacrylamide copolymers obtained by merely copolymerizing with an anionic monomer. A primary amino group introduced by the Holmann degradation reaction is a functional group exhibiting a cationic property in an acidic aqueous solution. This primary amino group has found many applications in flocculants, and papermaking additives. However, there has been no application of such functional group to a cement water reducing agent. The manner in which the primary amino group functions has not been found yet but it has been revealed that the present invention permits remarkable improvement of properties of acrylamide water reducing agents. Accordingly, the present invention is expected to be used widely in the future.

TABLE 2

| | | Base PAM | | Hofmann Degradation | Flow Value (Blank = 144) | | | |
|---|---|---|---|---|---|---|---|---|
| | Polymer | AM[1] | Mw[2] | Rate[3] mol % | 0.125% | 0.25% | 0.50% | 0.75 |
| Example 5 | C-1 | 30 | 30,300 | 27 | 203 | >300 | >300 | >300 |
| Example 6 | C-2 | 30 | 30,300 | 58 | 258 | >300 | >300 | >300 |
| Example 7 | C-3 | 30 | 30,300 | 100 | >300 | >300 | >300 | >300 |
| Example 8 | D-1 | 15 | 28,700 | 82 | 283 | >300 | >300 | >300 |
| Example 9 | E-1 | 10 | 26,700 | 77 | 195 | >300 | >300 | >300 |
| Comparative Example 3 | C-4 | 30 | 30,300 | 0.7 | —[4] | 173 | 203 | 225 |
| Comparative Example 4 | F | 20 | 17,800 | — | —[4] | 168 | 236 | 257 |

[1] $\alpha,\beta$-unsaturated monocarboxylic acid monomer (AM) (mol %) used for copolymer
[2] Weight average molecular weight
[3] Amount of sodium hypochlorite (mol %) relative to acrylamide monomer unit of base PAM
[4] Values not larger than Blank

What is claimed is:

1. A hydraulic cement composition comprising cement and an amphoteric polymer obtained by reacting an $\alpha,\beta$-ethylenically unsaturated carbonamide polymer having a weight average molecular weight of 1,000 to 1,000,000 with from 10 to 100 mole % of a hypohalogenous acid or salt thereof relative to the carbonamide groups of the polymer at a pH of 10 or higher wherein the amphoteric polymer is present in an amount sufficient to inhibit deterioration in workability over time.

2. The hydraulic cement composition of claim 1 wherein the $\alpha,\beta$-ethylenically unsaturated carbonamide polymer is acrylamide or methacrylamide.

3. The hydraulic cement composition of claim 1 wherein the amphoteric polymer is present in an amount of 0.01 to 2.5% by weight relative to the cement.

4. The hydraulic cement composition of claim 1 wherein the cement is selected from the group consisting of Portland cement, alumina cement, fly ash cement, blast furnace cement and silica cement.

5. The hydraulic cement composition of claim 1 wherein the composition further comprises at least one additive selected from the group consisting of air entraining agents, early strength agents, retarding agents, water-proofing agents, anti-rust agents, water holding agents, coloring agents, preservatives, glass fibers, fly ash, blast furnace slag and silica powder.

6. A hydraulic cement composition comprising cement and an amphoteric polymer obtained by reacting a copolymer of from 99.9 to 20 mole % of an $\alpha,\beta$-ethylenically unsaturated carbonamide and from 0.1 to 80 mole % of at least one anionic monomer selected from the group consisting of $\alpha,\beta$-ethylenically unsaturated monocarboxylic acid, $\alpha,\beta$-ethylenically unsaturated dicarboxylic acid, $\alpha,\beta$-ethylenically unsaturated sulfonic acid and salts thereof, said copolymer having a weight average molecular weight of 1,000 to 1,000,000, with from 10 to 100 mole % of a hypohalogenous acid or salt thereof relative to the carbonamide groups of the polymer at a pH of 10 or higher wherein the amphoteric polymer is present in an amount sufficient to inhibit deterioration in workability over time.

7. The hydraulic cement composition of claim 6 wherein the $\alpha,\beta$-ethylenically unsaturated carbonamide polymer is acrylamide or methacrylamide.

8. The hydraulic cement composition of claim 6 wherein the $\alpha,\beta$-ethylenically unsaturated monocarboxylic acid and salts thereof is selected from the group consisting of acrylic acid, methacrylic acid, crotonic acid and salts thereof.

9. The hydraulic cement composition of claim 6 wherein the $\alpha,\beta$-ethylenically unsaturated dicarboxylic acid and salts thereof is selected from the group consisting of maleic anhydride, maleic acid, fumaric acid, itaconic acid, citraconic acid and salts thereof.

10. The hydraulic cement composition of claim 6 wherein the $\alpha,\beta$-ethylenically unsaturated sulfonic acid and salts thereof is selected from the group consisting of vinyl sulfonic acid, allyl sulfonic acid, methallyl sulfonic acid, styrene sulfonic acid, 2-acrylamide-2-phenyl propane sulfonic acid, 2-acrylamide-2-methyl propane sulfonic acid and salts thereof.

11. The hydraulic cement composition of claim 6 wherein the amphoteric polymer is present in an amount of 0.01 to 2.5% by weight relative to the cement.

12. The hydraulic cement composition of claim 6 wherein the cement is selected from the group consisting of Portland cement, alumina cement, fly ash cement, blast furnace cement and silica cement.

13. The hydraulic cement composition of claim 6 wherein the composition further comprises at least one additive selected from the group consisting of air entraining agents, early strength agents, retarding agents, water-proofing agents, anti-rust agents, water holding agents, coloring agents, preservatives, glass fibers, fly ash, blast furnace slag and silica powder.

* * * * *

UNITED STATES PATENT AND TRADEMARK OFFICE
CERTIFICATE OF CORRECTION

PATENT NO. : 5,489,626

DATED: : February 6, 1996

INVENTOR(S) : Toshihiko TAKAKI et al

It is certified that error appears in the above-identified patent and that said Letters Patent is hereby corrected as shown below:

On the title page, item [56]: References Cited: Insert the following.

-- Database WPI, Section Ch, Week 8950, Derwent Publications Ltd., London, Great Britain, Class A93, AB 85-305875 and JP-B-01 055 210 (KAJIMA KK), November 1989 [Abstract]

Database WPI, Section Ch, Week 8412, Derwent Publications Ltd., London, Great Britain, Class A94, AB 84-072042 and JP-A-59 026 956 (TAKENAKA KOMUNTEN KK), February 1984 [Abstract] --

Signed and Sealed this

Eighth Day of October, 1996

*Attest:*

BRUCE LEHMAN

*Attesting Officer*     *Commissioner of Patents and Trademarks*